(12) United States Patent
Schøning

(10) Patent No.: US 10,099,839 B2
(45) Date of Patent: Oct. 16, 2018

(54) HEAT-RESISTANT TRAY PARTICULARLY FOR FOOD PRODUCTS AS WELL AS AN OVEN FOR USE IN THE HEATING THEREOF

(71) Applicant: Henny Jakobsgaard, Hørsholm (DK)

(72) Inventor: Lars Schøning, Charlottenlund (DK)

(73) Assignee: Henny Jakobsgaard, Hørsholm (DK)

(*) Notice: Subject to any disclaimer, the term of this patent is extended or adjusted under 35 U.S.C. 154(b) by 191 days.

(21) Appl. No.: 15/103,292

(22) PCT Filed: Dec. 10, 2014

(86) PCT No.: PCT/DK2014/000060
§ 371 (c)(1),
(2) Date: Jun. 9, 2016

(87) PCT Pub. No.: WO2015/086019
PCT Pub. Date: Jun. 18, 2015

(65) Prior Publication Data
US 2016/0304265 A1    Oct. 20, 2016

(30) Foreign Application Priority Data
Dec. 13, 2013  (DK) .............................. 2013 00690

(51) Int. Cl.
*B65D 81/34* (2006.01)
*A23L 3/005* (2006.01)
(Continued)

(52) U.S. Cl.
CPC ............ *B65D 81/343* (2013.01); *A23L 3/005* (2013.01); *A47J 37/0623* (2013.01); *B65D 25/04* (2013.01);
(Continued)

(58) Field of Classification Search
CPC ... A47J 37/0623; A47J 37/0629; A23L 3/005; A23L 3/10; H05B 6/46; H05B 6/62; H05B 6/54
(Continued)

(56) References Cited

U.S. PATENT DOCUMENTS 4,656,042 A * 4/1987 Risler ...................... A23B 7/01
                                                         220/506
5,580,594 A * 12/1996 Matsumoto ........... A47J 27/002
                                                         219/622
(Continued)

FOREIGN PATENT DOCUMENTS

| CA | 2777127 A1 | 11/2013 |
| JP | 01-182275 A | 7/1989 |
| JP | 01182275 A | 7/1989 |

*Primary Examiner* — Reginald L Alexander
(74) *Attorney, Agent, or Firm* — Maschoff Brennan

(57) ABSTRACT

By, according to the invention, producing a food product tray (1) with a lid (2) using a basic material (3) such as aluminum, and providing said material (3) with a coating (4) comprising at least two layers (9 and 10), of which at least one of the materials has a high emission value, it is possible with a suitable dimensioning and placement of the coating (4) on the inner and/or outer side of the tray (1) and the lid (2) to obtain a hitherto unknown precise heating of the individual food products within the same heating time in an oven (12). The oven (12) has heating elements (14-16) which may abut against the sides and bottom of the tray as well as against the lid (2), said heating elements (14-16) may have a zonal heat emission in order to obtain the best possible cooking of the food. A QR code (20) on the lid (2) readable by the oven (12) allows for programming the oven with a view to both heat exposure intensity and position of the heat exposure in relation to the food products (6A and 7A) in the tray (1).

15 Claims, 3 Drawing Sheets

Figure 1:
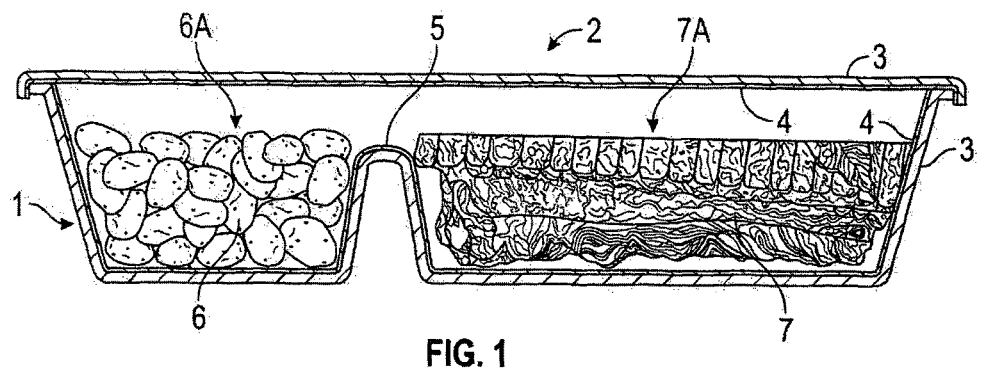

(51) Int. Cl.
    *A23L 3/10*     (2006.01)
    *H05B 6/46*     (2006.01)
    *F24C 7/06*     (2006.01)
    *B65D 25/04*     (2006.01)
    *B65D 43/02*     (2006.01)
    *A47J 37/06*     (2006.01)

(52) U.S. Cl.
    CPC .............. *B65D 43/02* (2013.01); *B65D 81/34* (2013.01); *F24C 7/06* (2013.01); *H05B 6/46* (2013.01); *A23L 3/10* (2013.01); *A47J 37/0629* (2013.01)

(58) Field of Classification Search
    USPC ........... 99/358, 451, 401, DIG. 14; 219/771, 219/775, 387, 395, 406, 621, 624; 220/577, 592.01; 126/275 E, 275 R
    See application file for complete search history.

(56) References Cited

U.S. PATENT DOCUMENTS

| | | | |
|---|---|---|---|
| 5,622,780 A | | 4/1997 | Paleari |
| 6,138,555 A | * | 10/2000 | Hata ........................ A23L 3/005 363/52 |
| 6,278,093 B1 | * | 8/2001 | Iacovacci ................ A23B 4/01 219/601 |
| 6,323,473 B1 | * | 11/2001 | Yamamoto ................ A23L 3/01 219/771 |
| 2003/0068413 A1 | | 4/2003 | Kennedy |
| 2010/0015313 A1 | * | 1/2010 | Harris ...................... F24C 7/08 426/523 |

* cited by examiner

HEAT-RESISTANT TRAY PARTICULARLY FOR FOOD PRODUCTS AS WELL AS AN OVEN FOR USE IN THE HEATING THEREOF

THE PRIOR ART

The invention relates to a heat-resistant tray with a removable lid or an alternative cover partly for storing particularly food products and partly for use in heating of said food products in an oven, said tray being formed with one or more compartments.

The need for ready meals, including particularly frozen meals, is increasing in step with modern living where time spent preparing and cooking food is limited.

Moreover, there is an increased need for ready meals within the health and nursing care industries, just as it has become a common offer to elders who are able to both store the ready meals in frozen condition and to heat the meals themselves according to need.

Ready meals served in trays have the advantage that the food can have a long shelf-life due to freezing, just as different types of food can be arranged in a tray to constitute a complete meal.

In this way, ready meals may be made available to the retail industry as well as to institutions, schools, nursing homes and other places where there is a need for food that merely needs heating in an oven to be ready to serve.

Generally, the ready meal is provided in a container such as a plastic, paper, cardboard or aluminum tray with a lid. The choice of material for the container depends on the heating method where heating in a microwave oven generally requires a non-metallic material, such as plastic, paper or cardboard, while heating in a conventional oven typically, due to the higher temperatures present within the oven cavity, requires a container of aluminum foil or other metals.

For use as a tray for food products to be heated in a microwave oven, JP O11 82 275 A discloses a metallic tray, which, on the inner side, is provided with two layers of ceramic material, each layer having at least two layers with different wavelengths, and thus different wavelength propagation due to the different refractions between the layers. In this way, the heat radiation in the tray takes place in many different directions, thereby ensuring a uniform heating of the food products in the tray.

This tray is therefore best suited for ready meals merely requiring heating to a certain temperature without regard to any need for differentiated heating for different food products, such as meat that requires high heat and e.g. vegetables that require less heat.

THE OBJECT OF THE INVENTION

The object of the invention is to obtain a perfect heating of the food products arranged in a tray in such a manner that heating of the food products that require high temperatures and the parts that require lower temperatures is ensured, and that these temperatures are obtained during the same heating time in the oven.

This object is obtained according to the invention when the tray and the lid on the inside and/or the outside are partially or completely covered by a coating with a high emission value and, optionally, a high refractive index.

In this surprisingly simple manner, it is possible to form a coating with a high emission value and thereby a controlled energy release in the form of heat, which can be concentrated in the places in the tray or the lid that correspond to the desired temperatures in the places in question in the tray and under the lid.

If ceramic materials are used in the coating, it will correspondingly be possible to differentiate according to the emission value/refractive index of the material, thereby obtaining a heating reflection depending on the need of the desired places in the tray.

By applying the coating onto the mentioned places and adapting the heat transfer of the coating to these places of the tray, as specified in claim 2, trays with lids can be produced with an exact heating exposure in the individual areas of the tray adapted to the food products in the tray—and thereby their heating requirements.

By designing the coating as a multiple-layer coating, as specified in claim 3, it is possible to obtain a refraction in the transition from one layer to the adjacent layer, thereby allowing for dimensioning the released heating effect in the individual zones of the tray.

By selecting the substances according to their properties, as specified in claim 4, trays can be produced for use in ovens of any type, including induction ovens.

By providing the lid or the outer side of the tray with a code and providing the oven with a scanner, as specified in claim 5, the oven can be programmed to obtain the desired temperature and heating time.

This will result in a hitherto unknown simple way of ensuring the best heating of the food products as this solution completely eliminates the need for manually setting the oven. If the food products are frozen, they can be thawed in a lenient manner prior to the primary heating in a corresponding manner.

By heating the tray in an oven with contact elements that may abut against the bottom and the sides of the tray as well as against the lid, as specified in claim 6, it is possible to obtain an energy-efficient heating with the possibility of individual heat release on the desired places on the tray and the lid. In this way, energy may be saved just as the heating time may be reduced correspondingly.

By providing the oven with a scanner for reading the code on the tray, as specified in claim 7, both the temperature and the heating time can be read by the oven when the tray is placed in the oven. This will automate the entire heating process and make it completely independent from any manual setting.

By mounting actuators on the individual contact elements, as specified in claim 8, these actuators can be activated when the tray is placed in the oven, and thereby ease the insertion of the tray, and further, when heating is completed, said actuators can move the elements away from the tray to ensure easy removal of the tray from the oven.

By providing the contact element/contact elements with a plurality of heating zones, as specified in claim 9, the heating can be adapted according to need.

Finally, it is advantageous, as specified in claim 10, to provide the upper element with needles or other tapering projections for penetrating the lid, thus allowing steam to be released in controlled form. Further, it will allow free or forced convection through the tray.

THE DRAWINGS

Figure 2:
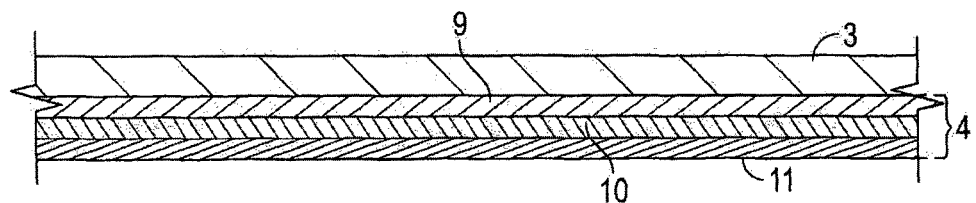
Figure 3:
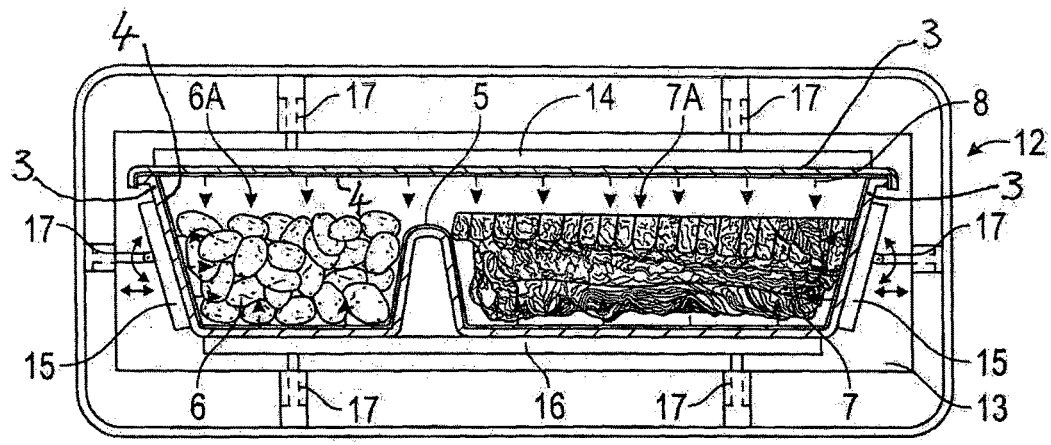
Figure 4:
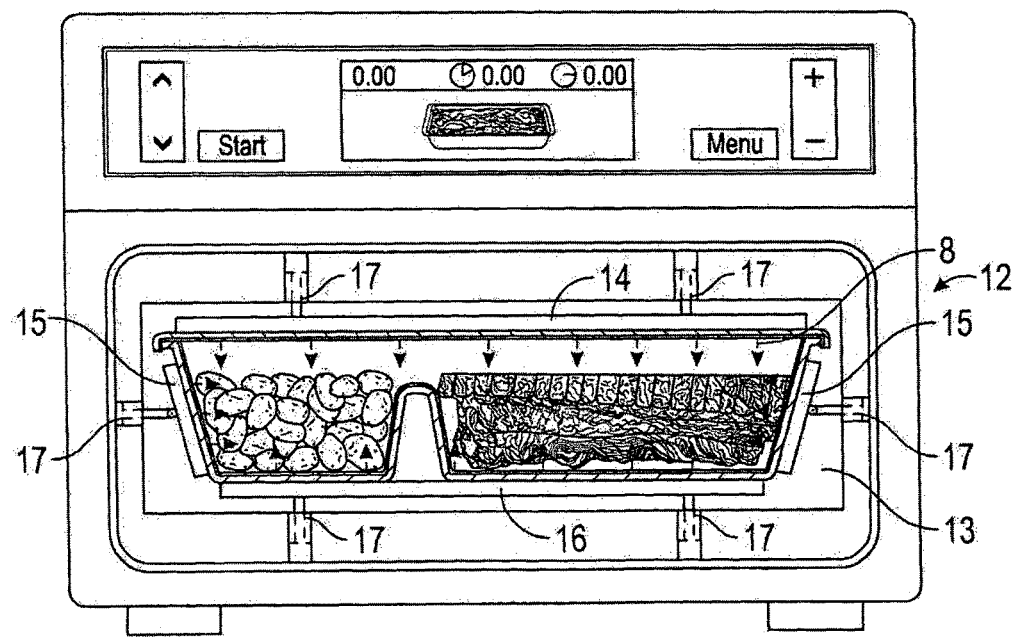
Figure 5:
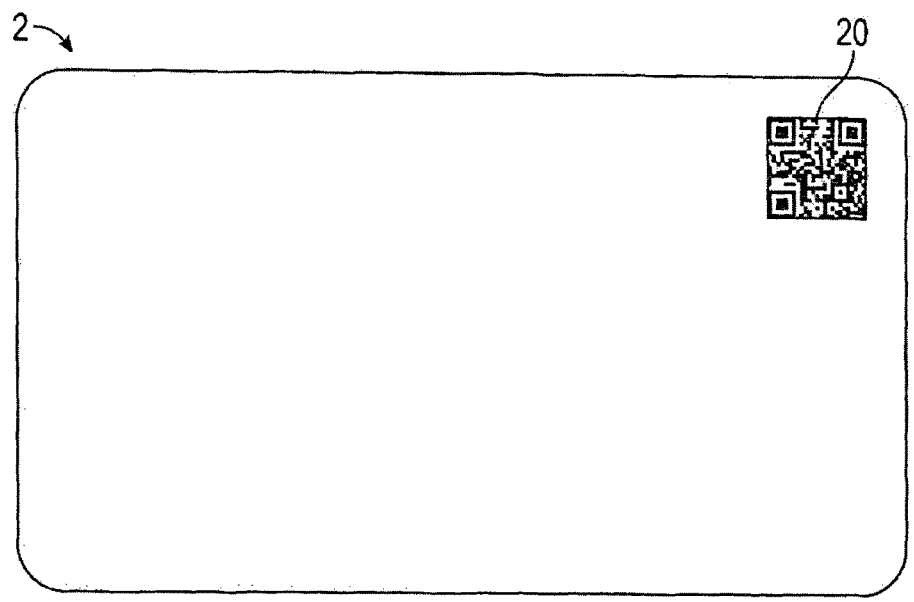
Figure 6:
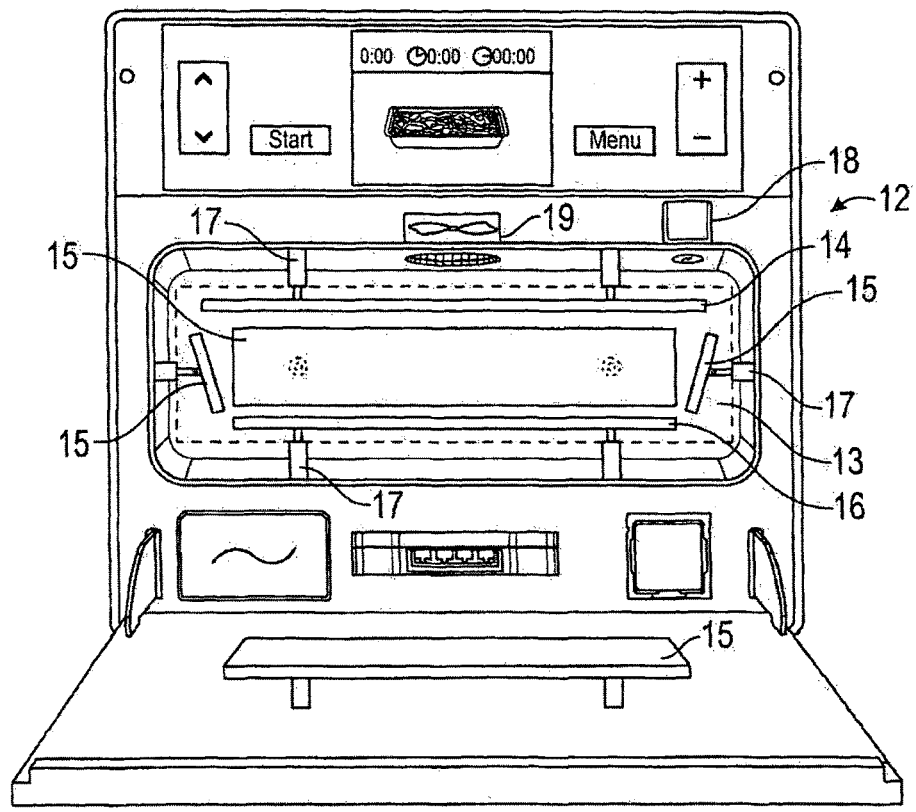

Embodiments of the invention will be described in detail below with reference to the drawings, in which FIG. 1 is a sectional view of a tray with food products, FIG. 2 is an enlarged sectional view of the tray/lid with coating, FIGS. 3 and 4 are sectional views of ovens with a tray inserted during heating, FIG. 5 is a top view of a lid, and FIG. 6 is a front view of an empty oven

DESCRIPTION OF THE EMBODIMENTS

FIGS. 1 and 2 show an example of a food tray, which will be described in further detail below, whereas the oven for use in the heating will be described subsequently with reference to FIGS. 3-6.

The tray may, as shown in FIG. 1, be either in the shape of a rectangular, oval or circular tray preferably made by aluminium as the basic material 3.

Naturally, alternative materials may be used, both organic and inorganic materials. However, due to the heat conduction, aluminium will be a preferred material. It is inexpensive and easy to shape for forming the tray.

In FIG. 1, the tray is divided into two compartments, a small compartment 6 and a larger compartment 7, respectively, but this serves merely as an example as the tray may have one or more compartments.

In the example shown, a partition wall 5 is formed by pressing up the bottom. The partition wall in this example does not entirely reach the lid 2 which allows heating by convection to be distributed across the entire tray.

If there is a need for separating and thus insulating individual compartments in order to obtain certain heat zones in the tray, the partition wall may extend all the way up to the lid 2.

The tray 1 is covered at the top, closed by means of a lid 2 which may be fastened to the upper edge of the tray, either as shown by curling the edge or by fixing the lid by welding or gluing. This lid 2 may likewise be made of aluminium as the basic material 3.

As an alternative to a lid, the tray may be covered with a flexible heat-resistant foil or alternative material that may be metallised to obtain improved heat conductivity.

In the example shown, both the tray 1 and the lid 2 are made of a basic material 3 forming the outer side of the tray and the lid.

As shown in FIG. 2, which is an enlarged sectional view of the basic material 3, said material is provided with a coating 4 in the form of a laminate.

This coating consists of at least two different layered materials 9 and 10. The materials may consist of powdered, micronised substances with high emission values and/or high refractive indexes.

Examples of such suitable substances are Ga with an index of approx. 4.0, CaP with an index of approx. 3.0, SiC with approx. 2.5, $TiO_2$ with approx. 2.4 and GaN with approx. 2.3. In addition, Carbon Black and Vantablack may be used as examples of materials with high emission values.

These materials are applied in layers to form a laminate 4, a first layer 9 being applied to the basic material 3, for example by impression, roller application or the like of a powdered material dissolved in a binder, after which an additional layer 10 may be applied.

These two layers have preferably different refractive values for forming an efficient internal refraction in the deflection of the heat waves between the layers.

Furthermore, a third layer 11 may be applied, which may consist of e.g. ZnS or $TiO_2$ which with their white colour give a nice appearance.

If there is a risk of the food being affected by the coating 4, or where there is a risk of it being scraped off when removing the food products, it is possible to apply a protective coating, such as a lacquer layer, on the inner side of the coating.

The tray and the lid produced as described above will be suitable for heating food products in microwave ovens, convection ovens and conventional electrotermal ovens.

As an alternative, the coating 4 may be applied on the outside of the tray 1 and the lid 2, i.e. with the basic material 3 facing inwards. This will protect the food against contact with the coating 4.

If heating is to take place in induction ovens, the material needs to be magnetic.

Finally, it should be mentioned that if ceramic materials are comprised in the coating, such materials need to have a high refractive index to obtain good heat reflection.

The purpose of coating the basic material 3 with such a coating of a laminate is that it allows for producing a tray with a lid with specific heating properties.

By way of example and as shown in FIG. 1, potatoes 6A are placed in the small compartment 6, whereas a piece of meat 7A is placed in the second compartment 7.

The piece of meat requires more heating and preferably a stronger heating from above, if e.g. it is a roast, whereas the potatoes require a more uniform and lower temperature during heating.

In order to be able to dimension the tray 1 and the lid 2 for these heating requirements, the composition and the placement of the coating on the tray and the lid are determining for the heat radiation conducted to the food products in the oven.

As indicated in FIG. 3, arrows 8 show how the heat exposure to the meat 7A is more intense than to the potatoes 6A, just as it is indicated that the heat radiation above the meat 7A is higher than the other heat exposures.

This has been obtained by an extra strong coating 4 partly on the right side of the tray and particularly on the lid above the meat.

In this manner, it is possible to heat the food in accordance with the requirements of the food products and a hitherto unknown high degree of precision may be obtained in such a manner that the best cooking temperature for the food product in question is applied in the same heating time.

In addition, it is also possible to complete the actual cooking of the food when heating the food in the oven as opposed to the commonly used method of first cooking the food and subsequently freezing it.

In this way, the food maintains its vitamin content as best possible just as energy is saved as the actual cooking takes place when heating the food in the oven.

With reference to FIGS. 3-6, an example of an oven for heating of such trays with food products will be described.

FIGS. 3 and 4 are sectional views of an oven 12 comprising an oven chamber 13. In this chamber 13, heating elements are arranged which may abut against the tray with the food products 6A and 7A, where the tray in this example is of a rectangular shape.

A heating element 16 is arranged under the tray, four heating elements 15 along the side walls of the tray and an upper heating element 14 may abut against the lid.

In order to ease both the insertion and the removal of the tray, some or all of the heating elements may be moved to and from the tray by means of actuators 17 which may also be swingable as implied with arrows in FIG. 3.

FIG. 6 shows an oven in open condition, said oven being provided with a blower 19 as well as a scanner 18.

This scanner 18 serves the purpose of reading a QR code 20 which may be placed on the outer side of the lid 2 as shown in FIG. 5.

In this way, the oven may by reading the QR code be programmed for obtaining an automatic setting of the oven when the tray has been inserted in the oven.

This allows for a significant advantage as it thereby is possible to incorporate a number of functions both with a view to food safety and the optimal cooking of the food.

As an example, the expiry date of the food products may be encoded in such a manner that the oven cannot be turned on when the date has expired and by means of the actuators the heating members can be moved for abutment against the trays depending on their shape and size.

In addition, the code may contain signals for controlling not only the temperature in the individual heating elements 14-16 but also any heating zones in the elements which must have a certain temperature, be it higher or lower depending on the food product and its placement in the tray.

Moreover, defrosting of frozen food products may take place at a suitable low temperature, whereas for example browning of a food product can be obtained by increased heat exposure, temperature in the area of the food product in question.

In other words, it will be possible to give a signal to the oven in any regard with respect to temperature, heat intensity and duration of the heating.

The said heating elements 14-16 may comprise electro-thermal elements which may be divided into zones for zonal heating of the tray.

In addition, it will be possible to incorporate in radiation heating elements, microwave elements, induction elements either separately and/or in combination.

Using induction ovens, it is possible to arrange a non-shown magnetic intermediate piece between the induction coil and the tray, said piece being movable to and from the tray completely corresponding to the previously mentioned heating elements 14-16.

In this way, it is possible to build ovens with specific properties in order to obtain the best possible cooking of the food just as the energy consumption will be reduced to the lowest possible.

The upper heating element 14 may contain non-shown tapering projections for penetrating the lid. This will be an advantage when heating fluid-containing food products, as the steam release then may escape through the perforations in the lid. Furthermore, free or forced convection inside the tray will be possible.

The invention claimed is:

1. A system comprising:
a heat-resistant tray;
a removable lid configured to cover the heat-resistant tray;
the heat-resistant tray comprising one or more compartments, and configured to partly store food products and partly heat food products in an oven, wherein the oven comprises heat-producing contact elements, where at least one of the heat-producing contact elements is an upper contact element configured to abut an outer surface of the removable lid and comprising penetrating means to form steam outlet openings in the heat resistant lid; and
wherein the heat-resistant tray and the removable lid are at least partially covered on the inner and/or outer surfaces with a coating with a high emission value, a high refractive index, or a combination thereof.

2. The system of claim 1, wherein the coating comprises one or more layers comprising a powdered, micronised substance.

3. The system of claim 1, wherein one or more of the heat-producing elements is configured to abut a bottom surface or side surfaces of the heat-resistant tray.

4. The system of claim 1, wherein the coating transmits heat by conduction, radiant heat, induction heat, convection heat, or a combination thereof.

5. The system of claim 1, wherein one or more of the heat-producing contact elements comprise actuators for movement for abutment against and movement away from the heat-resistant tray and/or the removable lid.

6. The system of claim 1, wherein the heat-producing contact elements comprise one or more heating elements for zonal heat release.

7. The system of claim 1, wherein the powdered, micronised substance comprises a material selected from the group consisting of carbon (C), silicon (Si), titanium oxide (TiO2), magnesium oxide (MgO), Zinc sulfate (ZnS) and gallium phosphate (GaP).

8. A system comprising:
a heat-resistant tray;
a removable lid configured to cover the heat-resistant tray;
the heat-resistant tray comprising one or more compartments, and configured to partly store food products and partly heat food products in an oven;
wherein the heat-resistant tray and the removable lid are at least partially covered on the inner and/or outer surfaces with a coating comprising a powdered, micronized substance selected from the group consisting of carbon (C), silicon (Si), titanium oxide (Ti2), magnesium oxide (MgO), zinc sulfate (Zn), and gallium phosphate (GaP).

9. The system of claim 1, wherein the coating comprises one or more layers comprising a powdered, micronised substance.

10. The system of claim 1, wherein the coating transmits heat by conduction, radiant heat, induction heat, convection heat, or a combination thereof.

11. The system of claim 1, wherein the oven further comprises:
heat-producing contact elements, the elements configured to abut a bottom surface, side surfaces of the heat-resistant tray as well configured to abut an outer surface of the removable lid.

12. The system of claim 11, wherein one or more of the heat-producing contact elements comprise actuators for movement for abutment against and movement away from the heat-resistant tray and/or the removable lid.

13. The system of claim 11, wherein the heat-producing contact elements comprise one or more heating elements for zonal heat release.

14. The system of claim 1, wherein the heat-producing contact elements comprise at least an upper contact element, and
wherein the upper contact element comprises penetrating means to form steam outlet openings in the lid.

15. The system of claim 9, wherein the powdered, micronised substance comprises a material selected from the group consisting of carbon (C), silicon (Si), titanium oxide (TiO2), magnesium oxide (MgO), Zinc sulfate (ZnS) and gallium phosphate (GaP).

* * * * *